United States Patent
Leon et al.

(10) Patent No.: US 6,818,559 B2
(45) Date of Patent: Nov. 16, 2004

(54) METHOD OF FABRICATION TO SHARPEN CORNERS OF Y-BRANCHES IN INTEGRATED OPTICAL COMPONENTS AND OTHER MICRO-DEVICES

(75) Inventors: Francisco A. Leon, Palo Alto, CA (US); Everett X. Wang, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 165 days.

(21) Appl. No.: 09/814,424

(22) Filed: Mar. 21, 2001

(65) Prior Publication Data

US 2002/0137247 A1 Sep. 26, 2002

(51) Int. Cl.$^7$ .............................................. H01L 21/311
(52) U.S. Cl. ..................... 438/700; 438/700; 438/701; 438/689; 438/25; 438/26; 216/24; 216/11
(58) Field of Search .......................... 438/25, 26, 700, 438/701, 689; 216/11, 24

(56) References Cited

U.S. PATENT DOCUMENTS

| | | | | |
|---|---|---|---|---|
| 4,039,370 A | * | 8/1977 | Kleinknecht ................. | 438/16 |
| 4,787,727 A | | 11/1988 | Boodman et al. | |
| 5,127,081 A | | 6/1992 | Koren et al. | |
| 5,281,305 A | | 1/1994 | Lee et al. | |
| 5,364,495 A | * | 11/1994 | Van Der Tol et al. ........ | 438/31 |
| 5,757,995 A | | 5/1998 | Chen et al. | |
| 5,874,353 A | * | 2/1999 | Lin et al. .................... | 438/592 |
| 5,880,019 A | * | 3/1999 | Hsieh et al. ................. | 438/666 |
| 5,918,131 A | * | 6/1999 | Hsu et al. .................... | 438/296 |
| 5,956,598 A | * | 9/1999 | Huang et al. ................ | 438/424 |
| 5,981,356 A | * | 11/1999 | Hsueh et al. ................ | 438/424 |
| 5,985,725 A | * | 11/1999 | Chou ........................ | 438/294 |
| 6,022,671 A | * | 2/2000 | Binkley et al. ............. | 430/321 |
| 6,054,745 A | * | 4/2000 | Nakos et al. ................ | 257/415 |
| 6,194,284 B1 | | 2/2001 | Chen | |
| 6,194,285 B1 | * | 2/2001 | Lin et al. .................... | 438/424 |
| 6,195,478 B1 | | 2/2001 | Fouquet | |
| 6,229,949 B1 | * | 5/2001 | Ido et al. .................... | 385/145 |
| 6,322,634 B1 | * | 11/2001 | Pan ........................... | 148/33.3 |
| 6,370,306 B1 | * | 4/2002 | Sato et al. .................. | 385/129 |
| 2001/0055440 A1 | | 12/2001 | Sakuma et al. | |
| 2002/0136518 A1 | * | 9/2002 | Wang et al. ................ | 385/132 |

FOREIGN PATENT DOCUMENTS

| | | | |
|---|---|---|---|
| EP | 0 462 599 A2 | 12/1991 | |
| JP | 02251912 | 10/1990 | |
| JP | 05281699 | 10/1993 | |
| JP | 07140341 | 6/1995 | |
| JP | 07201804 | 8/1995 | |
| JP | 09080246 | 3/1997 | |
| TW | 434734 A | 5/2003 | |
| WO | Wo 9837445 A1 * | 8/1998 | ............ G02B/6/12 |

OTHER PUBLICATIONS

International Search Report PCT/US02/02285, dated Jan. 8, 2003.
Shani, Y., et al., "Buried Rib Passive Waveguide Y Junctions With Sharp Vertex On InP", *IEEE Photonics Technology Letters*, vol. 3, No. 3, (Mar. 1991) pp. 210–212.
Van Der Tol, J.J. G. M., et al., "Sharp Vertices In Asymmetric Y–Junctions by Double Masking", *IEEE Photonics Technology Letters*, vol. 6, No. 2, (Feb. 1994) pp. 249–251.
Yokoyama, S., et al, "Optical Waveguides On Silicon Chips", Journal of Vacuum Science & Technology, vol. 13, No. 3 (May /Jun. 1995) pp. 629–635.

* cited by examiner

*Primary Examiner*—Nadine G. Norton
*Assistant Examiner*—Matthew Song
(74) *Attorney, Agent, or Firm*—Blakely, Sokoloff, Taylor & Zafman LLP

(57) ABSTRACT

Substantially sharp corners for optical waveguides in integrated optical devices, photonic crystal devices, or for micro-devices, can be fabricated. Non-sharp corners such as rounded corners, are first formed using lithographic patterning and vertical etching. Next, isotropic etching is used to sharpen the rounded corners. A monitor can be used to determine if the rounded corners have been sufficiently sharpened by the isotropic etching.

21 Claims, 4 Drawing Sheets

US 6,818,559 B2

METHOD OF FABRICATION TO SHARPEN CORNERS OF Y-BRANCHES IN INTEGRATED OPTICAL COMPONENTS AND OTHER MICRO-DEVICES

TECHNICAL FIELD

This disclosure relates generally to circuit fabrication, and in particular but not exclusively, relates to a method of fabrication to sharpen corners used in Y-branches, such as those in integrated optical components, photonic crystal devices, and other micro-devices.

BACKGROUND

Integrated optical devices, such as those formed on a planar lightwave circuit chip, typically include optical components in the form of optical waveguides. In fact, optical waveguides are often the fundamental component of all integrated optical devices. The optical waveguides operate to direct light signals from one location to another, and often branch out or "split" at various locations to allow the light signals to propagate to several different locations. A "Y-branch" splitter configuration for an optical waveguide is a common configuration, although other configurations are also possible.

Because of the large size of a wafer having integrated optical devices (e.g., a large field size), contact lithography techniques are often used to manufacture optical waveguides. Through the use of lithographic patterning and etching, multiple optical waveguides (including their Y-branches) can be formed on a semiconductor chip.

However, contact lithography and other large-field lithography techniques produce non-optimal rounded corners or edges at the Y-branch. That is, their large exposure causes their resolution to suffer, thereby making sharp corners difficult to create. The rounded corners that result from poor resolution adversely affect efficiency and performance of the integrated optical device and the overall performance of the optical network. Specifically, the rounded corners present a large profile for light signals incident at the splitter location. This causes the incident power on the Y-branch to become non-guided or scattered, and therefore lost in the device.

In certain applications, high-resolution steppers and scanners (e.g., another type of lithography technique) are available. However, these instruments are impractical for an integrated optical device application due to their limited field size. Furthermore, optical performance considerations preclude the "stitching together" of multiple small-sized fields that have been formed using high-resolution steppers and scanners. Moreover, due to the wave-nature of light used in lithographic methods and due to the surface tension of the photoresist during the expose and development process, the resulting edges are rounded, which limits the optical performance of certain devices.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

Embodiments of a method of fabrication to sharpen corners, such as those located at Y-branches, in integrated optical components and other micro-devices are described herein. In the following description, numerous specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For simplicity and clarity of explanation, embodiments of the invention are shown in the figures using various views. It is to be appreciated that such views are merely illustrative and are not necessarily drawn to scale or to the exact shape. Furthermore, it is to be appreciated that the actual devices utilizing principles of the invention may vary in shape, size, configuration, contour, and the like, other than what is shown in the figures, due to different manufacturing processes, equipment, design tolerances, or other practical considerations that result in variations from one semiconductor device to another.

Figure 1:
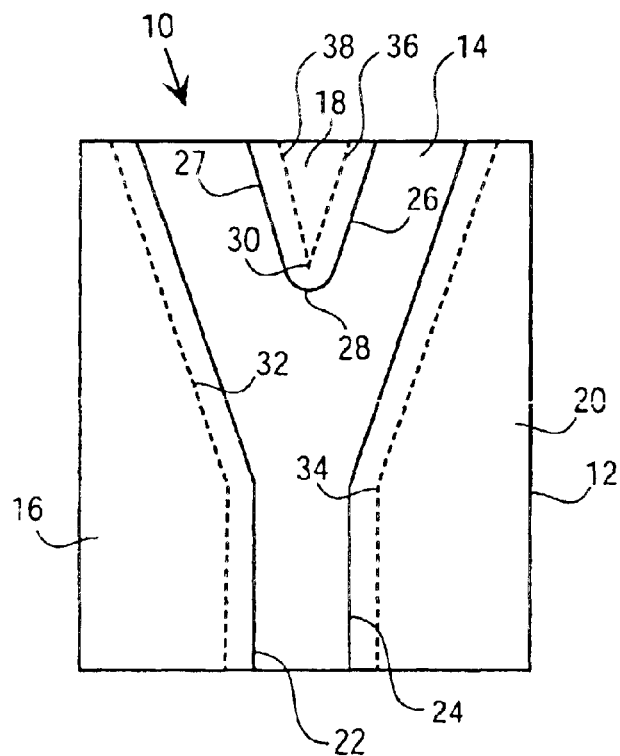
FIG. 1 is a top view of a Y-branch of an integrated optical device illustrating a comparison of a sharpened corner, according to an embodiment of the invention, to a rounded corner.

Referring first to FIG. 1, shown generally at 10 is a top view of a Y-branch that forms part of an optical waveguide for an integrated optical device. The Y-branch 10 may be formed on an integrated circuit 12 in one embodiment. The Y-branch 10 includes a region 14 where core material for the waveguide may be located, as well as regions 16, 18, and 20 where cladding material may be located.

Solid lines denote where conventional lithography techniques (e.g., patterning and etching) produce edges 22, 24, 26, and 27. In particular, a rounded corner 28 is formed at the region 18. In accordance with an embodiment of the invention, an etching technique (such as an isotropic etch) can be performed to increase the sharpness of the rounded corner 28, as shown by broken lines (e.g., edges 36 and 38) that come together to a sharp corner 30. This etching can also further widen the region 14 for the core material, as shown by broken lines that denote edges 32, 34, 36, and 38.

Figure 2:
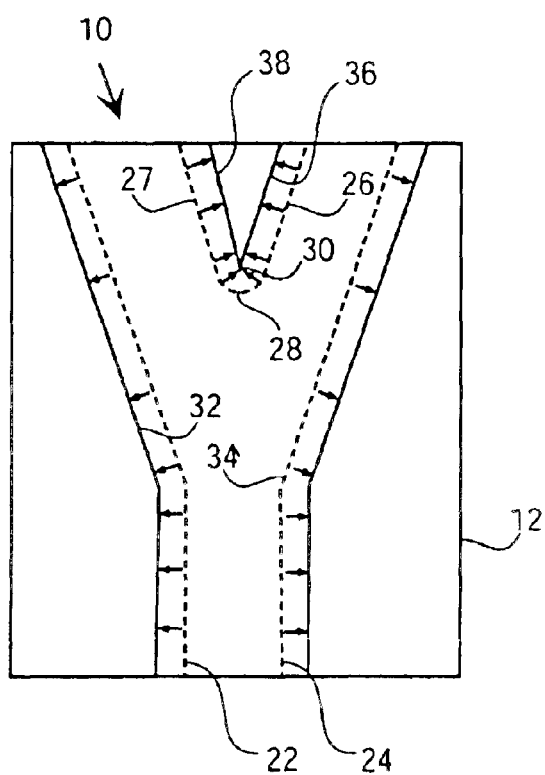
FIG. 2 is a top view of the Y-branch of FIG. 1 illustrating a sharpening of the rounded corner according to an embodiment of the invention.

FIG. 2 illustrates the sharpening of the rounded corner 28 according to an embodiment of the invention. In particular, the rounded corner 28 and the edges 26 and 27 (now shown as broken lines) are etched (shown symbolically as arrows), eventually forming the edges 36 and 38 (now shown as solid lines) that intersect to the sharp corner 30. Because an etching process (such as an isotropic etch) etches away material uniformly in all directions, the etching at the semi-circle region of the rounded corner 28 produces a substantially sharp intersection/edge at the sharp corner 30.

In accordance with an embodiment of the invention, the edges 22 and 24 (now shown as broken lines) are also etched by the same etching process to form the edges 32 and 34 (now shown as solid lines), respectively. After completion of this etching to sharpen the rounded corner 28 of the Y-branch 10, core material can be deposited into the region 14 in accordance with an embodiment that will be described later below.

Figure 3:
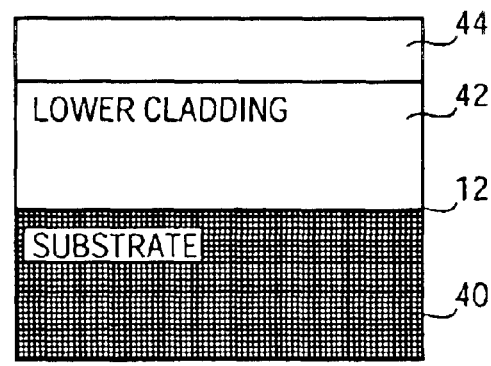
FIGS. 3–8 are cross-sectional views illustrating process flows to sharpen the rounded corner of the Y-branch and to form the integrated optical device of FIGS. 1–2.

FIGS. 3–8 are cross-sectional views illustrating process flows to sharpen the rounded corner 28 of the Y-branch 10, as well as to form the Y-branch 10 itself as a waveguide on the integrated circuit 12, in accordance with an embodiment of the invention. In FIG. 3, a substrate 40 (made of a silicon or glass material, for example) has deposited or otherwise disposed on its top surface a cladding material 42. The cladding material 42 can form the lower cladding of the waveguide, as well as a portion of the spacing between branches of the Y-branch 10 in one embodiment (e.g., the lateral cladding). A suitable material that can be used for the cladding material 42 is silicon dioxide in an embodiment. A photoresist material 44 (unpatterned) is formed over the cladding material 42.

Figure 4:
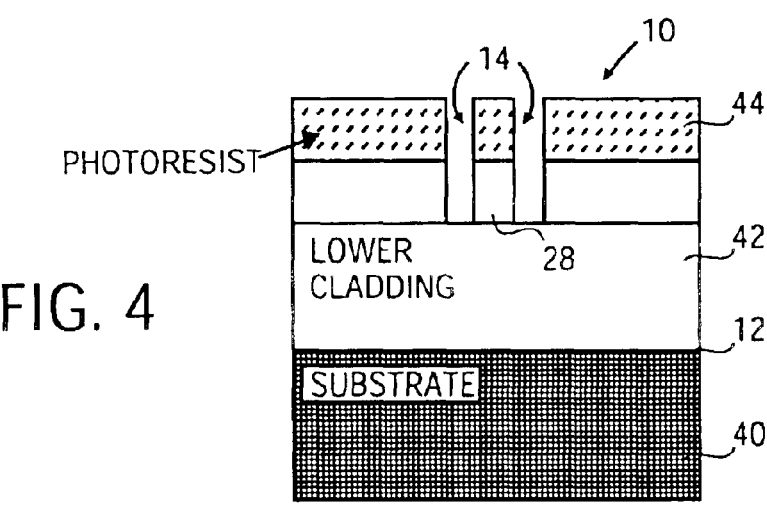

Next in FIG. 4, lithographic patterning is performed on the photoresist material 44 to define the shape of the Y-branch 10, along with vertical etching to obtain wells or trenches that define the region 14 of the Y-branch 10 where the core material is to be placed. In one embodiment, the vertical etching through the photoresist material 44 to form the trenches for the region 14 can use an anisotropic etching technique that selectively removes the cladding material 42 at the region 14.

Figure 5:
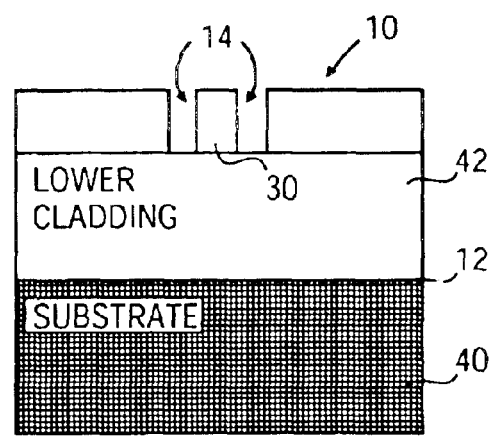

All of the photoresist material 44 can be removed next in an embodiment. In another embodiment, the photoresist material 44 can be kept in place for the next process. Whether kept in place or removed, an isotropic etch is performed next in FIG. 5 to sharpen the rounded corner 28 to obtain the sharp corner 30. In one embodiment, a conventional etching acid can be deposited in the trenches of the region 14 to sharpen the rounded corner 28 and to widen the trenches, by removing portions of the cladding material 42 adjacent to the region 14 as depicted in FIG. 5.

Figure 6:
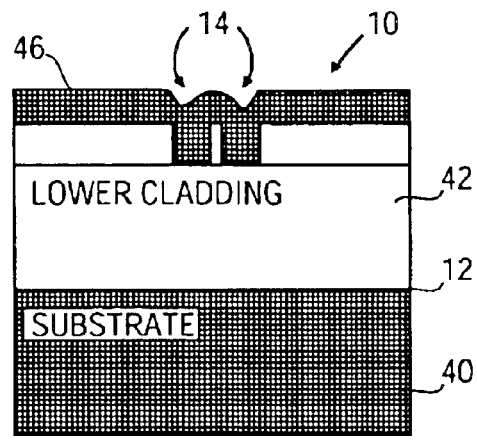
Figure 7:
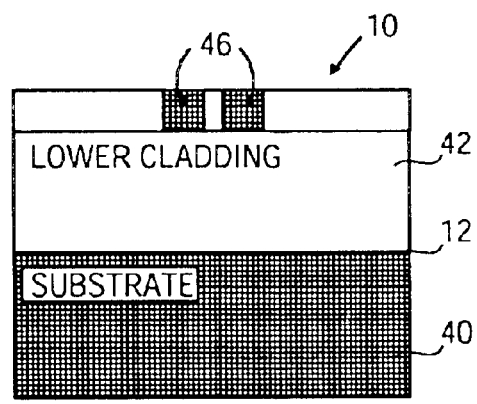

A core material 46 is then deposited in the trenches of the region 14 in FIG. 6. Thin film deposition techniques and/or re-flow techniques can be used in one embodiment to fill the trenches of the region 14 with the core material 46. Examples of suitable core material include, but are not limited to, germanium-doped silicon dioxide, silicon nitride, silicon, or indium-phosphate material. At least some of the core material 46 may be deposited over non-core regions during the deposition process of FIG. 6. A chemical-mechanical polishing may be performed in FIG. 7 to remove the excess core material 46 except at the core regions 14.

Figure 8:
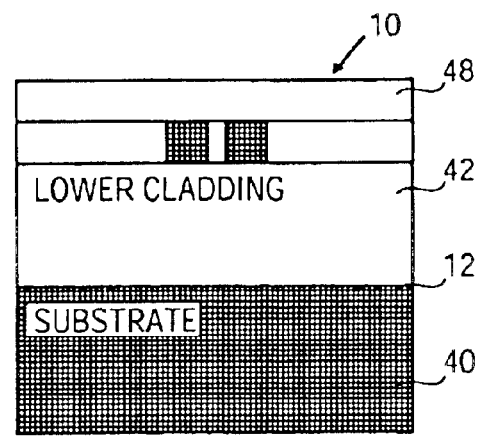

In FIG. 8, an upper or final cladding material 48 is deposited or re-flowed over the core material 46, over the spacing 30, and over the rest of the cladding material 42. Thin film deposition techniques can be used in one embodiment to deposit the upper cladding material 48. The upper cladding material 48 can include, but not be limited to, silicon dioxide, phosphorous-doped silicon oxide, or other suitable cladding material.

Accordingly as shown in FIGS. 3–8, sharp corners can be created in one embodiment by using an isotropic etch process after a lithography process. This produces a corner that is sharper than those that can be defined by conventional lithography. For example, a round corner may have a thickness/diameter of approximately one micron, while an embodiment of the invention can produce a sharp corner that approaches approximately 0.1 micron.

Figure 9:
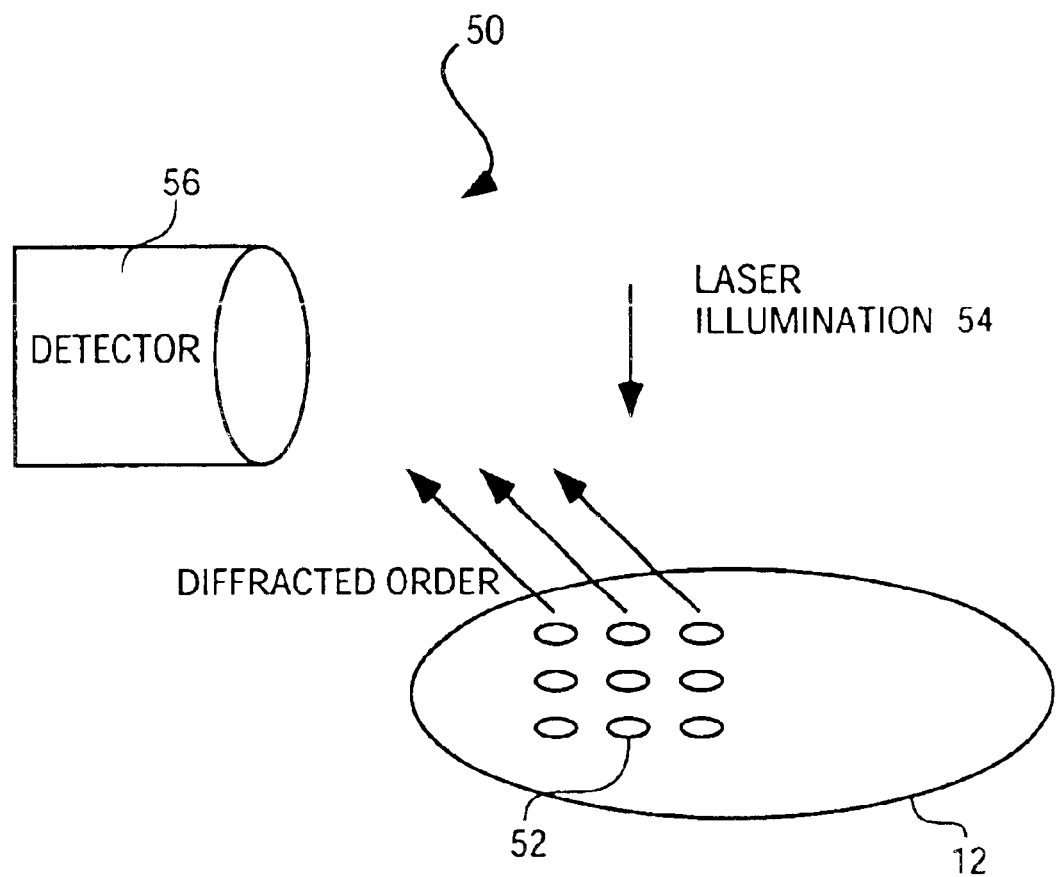
FIG. 9 is a schematic diagram of an embodiment of an apparatus and method to monitor etching that sharpens the corner of the Y-branch of FIGS. 1–8.

One embodiment of the invention provides a wafer monitor apparatus and method to provide information as to when to stop the etching of FIG. 5 to obtain the sharp corner 30. Such an apparatus and method is helpful, for instance, so that the etching is not stopped prematurely (resulting in under-etching that produces a non-sharp corner) or so that the etching is not stopped too late (resulting in over-etching that removes too much material). An embodiment of such an apparatus and method is shown as a monitor 50 in FIG. 9.

One embodiment of the monitor 50 can be an "in-situ" etch monitor, such that minimum feature size pillars 52 are on the same chip or integrated circuit 12 as the Y-branch 10. The pillars 52 can be formed during the same lithographic patterning and vertical etch processes shown in FIGS. 3 and 4. That is, the pillars 52 are formed concurrently with the rounded corner 28 using patterning and vertical etching, and are made of the same material (e.g., the same material as the lower cladding material 42). In an embodiment, the pillars 52 are semi-circular or circular in shape, and each pillar has substantially the same radius or dimension as the rounded corner 28.

In an embodiment, the pillars 52 can be formed in a group such that a diffraction grating results if the pillars are illuminated by a laser light or other light source at 54. A suitable detector 56, such as an avalanche photodiode, PIN photodetector, or other photosensitive device can be used to detect the light diffracted by the pillars 52. In operation according to an embodiment, the pillars 52 are etched during the same etching process used to sharpen the rounded corner 28, while being illuminated by the light source at 52. Since the pillars 52 each have a radius that is substantially the same as the radius of the rounded corner 28, the amount of time used to eliminate (e.g., etch away) the pillars 52 is equal to the amount of time to sharpen the rounded corner 28 into the sharp corner 30. Elimination of the pillars 52 during the etching process results in a detection (by the detector 56) of one of the diffraction orders or detection of some type of change in the light diffracted from the pillars 52. From this detected information, elimination of the pillars 52 (and hence the completion of sharpening of the rounded corner 28 into the sharp corner 30) can be determined.

In conclusion, an embodiment of the invention can provide an improved Y-branch splitter having a corner that is sharper, regardless of the lithography resolution. A Y-branch splitter having a sharp corner can provide higher efficiency, resulting in an overall improvement in performance of the integrated optical device.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

For instance, while an embodiment of the invention has been described herein as producing a sharp corner for a Y-branch of an integrated optical device, it is to be appreciated that embodiments of the invention can be implemented for other components of an integrated optical device that do not necessarily have "Y" configurations. Furthermore, embodiments of the invention may involve devices other than integrated optical devices. Various micro-devices or micro-structures, such as microelectromechanical structures (MEMS) and photonic bandgap material, can be fabricated to have sharper corners based on the embodiments of methods described herein. Indeed, an embodiment of the invention can be used for any type of micro-device that would benefit from having a sharper corner or a sharper edge. The corner may be surrounded by a region having a different material, such as in the Y-branch 10 for a waveguide shown in FIGS. 3–8, or the different material can be air, as with some MEMS devices that may utilize the corner as a pivot point or cantilever.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
   lithographically patterning an optical waveguide pathway over a material, the optical waveguide pathway including a first branch, a second branch, and a corner where the first branch intersects the second branch;
   anisotropically etching portions of the material based on the lithographic pattern to obtain a region of the material that defines the corner; and
   isotropically etching additional portions of the material from the region of the material to sharpen the corner.

2. The method of claim 1 wherein lithographically patterning the corner includes applying a photoresist material.

3. The method of claim 2, further comprising removing the photoresist material from selected areas prior to sharpening the corner.

4. The method of claim 2 wherein the corner is sharpened while the photoresist is in place.

5. The method of claim 1 wherein the material comprises a first material, the method further comprising:
   placing a second material in the region; and
   removing excess second material from areas outside of the region.

6. The method of claim 5 wherein removing excess second material comprises using a chemical-mechanical polishing technique.

7. The method of claim 5, further comprising placing a third material over the second material.

8. The method of claim 7 wherein placing the third material over the second material and placing the second material in the region comprises using a deposition technique.

9. The method of claim 7 wherein the first and third materials comprise cladding material, and wherein the second material comprises core material.

10. The method of claim 1 wherein the first branch, the second branch, and the corner comprise part of a Y-branch of an optical waveguide of an integrated optical device.

11. The method of claim 1 wherein the corner comprises part of one of a microelectromechanical structure (MEMS) device, a photonic crystal device, or a photonic bandgap device.

12. The method of claim 1, further comprising monitoring the removal of the portions of the material adjacent to the region if sufficient time has elapsed to sharpen the corner.

13. The method of claim 12 wherein monitoring the removal of the portions of the material adjacent to the region comprises:
   forming a diffraction grating having pillars of a substantially same radius as the corner to be sharpened, wherein the corner is rounded;
   illuminating the pillars with a light and detecting light diffracted from the pillars; isotropically etching the pillars concurrently with isotropically etching additional portions of the material from the region of the material; and
   determining if sufficient time has elapsed to sharpen the corner based on the detected light diffracted from the pillars as they are isotropically etched.

14. A method, comprising:
   lithographically patterning a Y-branch optical waveguide pathway over a cladding material deposited on a substrate, the Y-branch optical waveguide pathway including a corner where a first branch of the Y-branch optical waveguide pathway splits into a second branch and a third branch of the Y-branch optical waveguide pathway;
   based on the lithographic pattern, vertically etching the cladding material to selectively remove portions of the cladding material to form a rounded corner in the cladding material based on the corner of the Y-branch optical waveguide pathway; and
   isotropically etching the cladding material to selectively remove additional portions of the cladding material at the rounded corner to sharpen the rounded corner.

15. The method of claim 14, further comprising depositing a core material in a trench, adjacent to the sharpened corner, which was formed by the vertical etching and by the isotropic etching.

16. The method of claim 15, further comprising depositing another cladding material over the core material, subsequent to a chemical-mechanical polish process to remove excess core material deposited outside of the trench.

17. The method of claim 14, further comprising:
   forming pillars concurrently with the vertical etching of the cladding material, the pillars having a dimension comparable to that of the rounded corner; and
   isotropically etching the pillars concurrently with the rounded corner to determine completion of the sharpening based on light diffracted from the pillars.

18. The method of claim 14 wherein lithographically patterning the corner includes using a photoresist.

19. A method, comprising:
   lithographically patterning a corner over a cladding material deposited on a substrate;
   based on the lithographic pattern, vertically etching the cladding material to selectively remove portions of the cladding material to define a rounded corner;
   isotropically etching the cladding material to selectively remove additional portions of the cladding material at the rounded corner to sharpen the rounded corner;
   forming pillars concurrently with the vertical etching of the cladding material, the pillars having a dimension comparable to that of the rounded corner; and
   isotropically etching the pillars concurrently with the rounded corner to determine completion of the sharpening based on light diffracted from the pillars.

20. The method of claim 19 wherein the corner comprises a portion of a Y-branch of an optical waveguide.

21. The method of claim 19, further comprising:

depositing a core material in a trench, adjacent to the sharpened corner, which was formed by the vertical etching and by the isotropic etching; and depositing another cladding material over the core material, subsequent to a chemical-mechanical polish process to remove excess core material deposited outside of the trench.

\* \* \* \* \*